(12) United States Patent
Ferkul

(10) Patent No.: US 9,346,389 B2
(45) Date of Patent: May 24, 2016

(54) CARGO HANDLING SYSTEM

(71) Applicant: Martin P. Ferkul, Eveleth, MN (US)

(72) Inventor: Martin P. Ferkul, Eveleth, MN (US)

(*) Notice: Subject to any disclaimer, the term of this patent is extended or adjusted under 35 U.S.C. 154(b) by 0 days.

(21) Appl. No.: 14/826,647

(22) Filed: Aug. 14, 2015

(65) Prior Publication Data

US 2016/0068091 A1 Mar. 10, 2016

Related U.S. Application Data

(60) Provisional application No. 62/070,759, filed on Sep. 5, 2014.

(51) Int. Cl.
  *B60P 1/32* (2006.01)
(52) U.S. Cl.
  CPC ........................................ *B60P 1/32* (2013.01)
(58) Field of Classification Search
  CPC ........................................................ B60P 1/32
  USPC ................................ 298/1 A, 12, 13, 14, 17.5
  See application file for complete search history.

(56) References Cited

U.S. PATENT DOCUMENTS

| | | | |
|---|---|---|---|
| 4,522,326 A | 6/1985 | Tuohy, III | |
| 4,647,110 A * | 3/1987 | McKee | B60P 1/32 298/1 A |
| 4,705,315 A | 11/1987 | Cherry | |
| 4,909,558 A | 3/1990 | Roshinsky | |
| 4,950,123 A | 8/1990 | Brockhaus | |
| 4,993,088 A | 2/1991 | Chudik | |
| 5,052,878 A | 10/1991 | Brockhaus | |
| 5,064,335 A | 11/1991 | Bergeron | |
| 5,513,941 A | 5/1996 | Kulas et al. | |
| 5,649,731 A | 7/1997 | Tognetti | |
| 5,820,190 A | 10/1998 | Benner | |
| 5,915,773 A | 6/1999 | Deutsch et al. | |
| 5,934,725 A | 8/1999 | Bowers | |
| 5,938,262 A | 8/1999 | Mills | |
| 6,065,792 A | 5/2000 | Sciullo et al. | |
| 6,390,525 B2 | 5/2002 | Carpenter | |
| 6,659,524 B1 | 12/2003 | Carlson | |
| 6,712,415 B1 | 3/2004 | Darbishire et al. | |
| 6,860,536 B1 | 3/2005 | Schimunek | |
| 8,240,527 B1 | 8/2012 | Casselton | |
| 8,763,820 B2 | 7/2014 | Hanley | |
| 2003/0146636 A1 | 8/2003 | Keller | |

* cited by examiner

*Primary Examiner* — Stephen Gordon
(74) *Attorney, Agent, or Firm* — Jean Lown; Brad Wright

(57) ABSTRACT

A cargo handling system includes a guide assembly, a lower extendable assembly, and an upper extendable assembly. The cargo handling system can be placed on a cargo bed of a transport vehicle. The cargo handling system allows a vehicle operator easy access to portions of a cargo bed that are difficult to reach, and facilitates unloading of cargo.

19 Claims, 14 Drawing Sheets

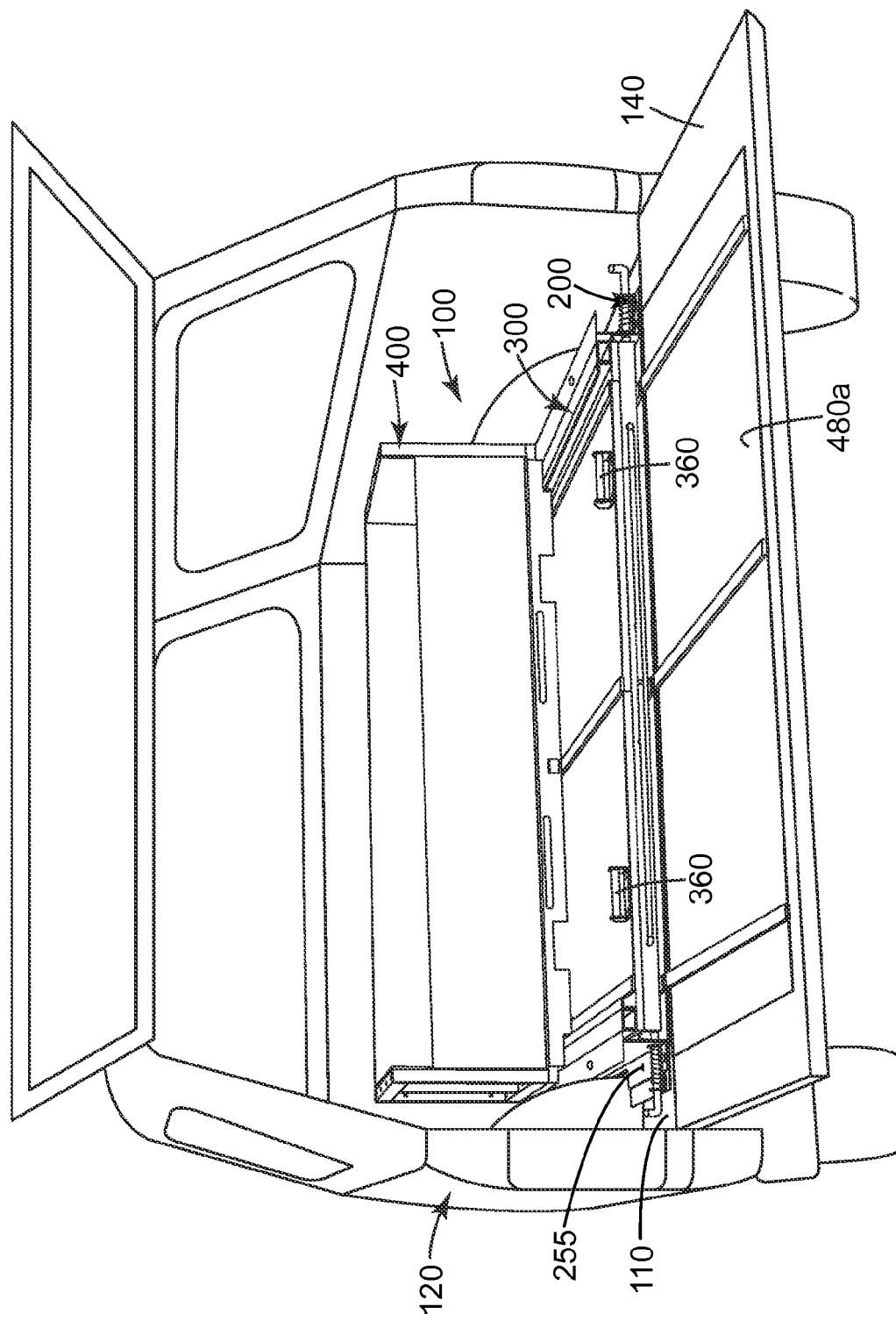

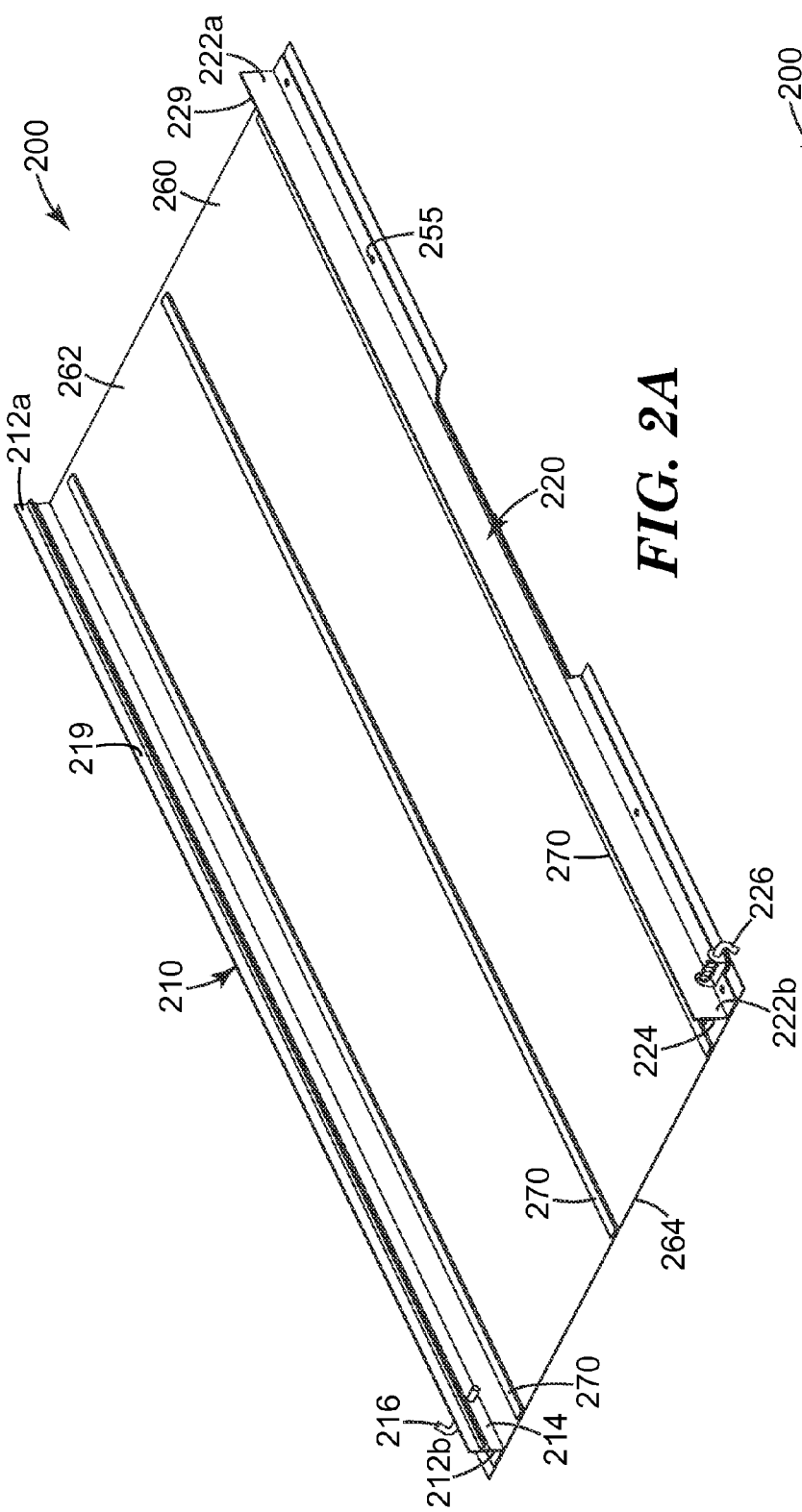
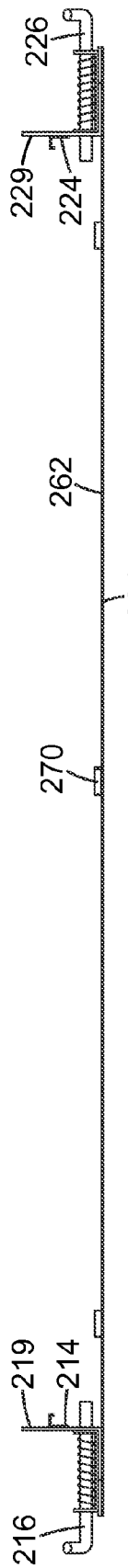
FIG. 2A
FIG. 2B

CARGO HANDLING SYSTEM

CROSS-REFERENCE TO RELATED APPLICATION

This application claims the benefit of U.S. Provisional Application No. 62/070,759, entitled "Dual and a Multi-drawer System for Vehicles", filed Sep. 5, 2014, the disclosure of which is incorporated herein by reference in its entirety.

TECHNICAL FIELD

The present disclosure broadly relates to cargo handling systems.

BACKGROUND

Pickup trucks and other load carrying vehicles (e.g., trade vans and light utility vehicles) are useful for transporting cargo from one location to another. The cargo may include items that are loaded at a point of departure and unloaded upon arrival at a particular destination. Examples of cargo include yard waste, demolition waste, construction materials, and recreational supplies. In some cases, the cargo items may remain loaded on the vehicle for periodic access such as, for example, mechanical parts or tools that are used on an intermittent basis.

Cargo is commonly transported and/or stored in a cargo storage portion of the vehicle; for example, in the rear cargo compartment of a pickup truck, which may be open or closed (e.g., if fitted with a tonneau or topper), or in the rear interior compartment of a utility van.

While pickup trucks have remained popular over the years, a constant problem has been that not all areas of the cargo bed are easily accessible. For example, in the case of pickup trucks fitted with tonneau covers or toppers, the ability to access the entire cargo bed of a pickup truck easily and effectively by an operator positioned at the edge of an open tailgate continues to present a problem. Further, in the case of weighty cargo such as concrete, sand, dirt, wood, etc., which may have a weight of a ton or more, handling of the cargo can be difficult for an individual person to perform without a power assist device.

SUMMARY

The present disclosure provides a cargo handling system for vehicles having a cargo bed (e.g., pickup trucks, trade vans, and other load carrying vehicles), which allows easy access to the cargo in the cargo bed by bringing the far reaches of the cargo bed toward the vehicle cab) to the rear access of the vehicle (e.g., tailgate, or door(s)). Advantageously, the cargo handling system enables easy access without the operator having to climb into and/or crawl around in the cargo bed to load/unload anything needed in the entire length of the bed. Further, and importantly, cargo handling systems according to the present disclosure can also dump the cargo, if desired, thereby facilitating the unloading process.

Accordingly, in one aspect, the present disclosure provides a cargo handling system comprising:
  a guide assembly comprising:
    parallel first and second guide rails each comprising respective front and back rail ends, wherein the first guide rail has an inward facing first channel and the second guide rail has an inward facing second channel, wherein the first guide rail has a first guide locking member secured thereto toward the back rail end of the first guide rail, and wherein the second guide rail has a second guide locking member secured thereto toward the back rail end of the second guide rail;
  a lower extendable assembly comprising:
    a lower structure comprising a lower top and lower bottom, lower front and lower back ends, and opposed lower first and lower second sides linking the lower front and lower back ends;
    a first lower locking member disposed adjacent the lower first side for engaging the first guide locking member; and
    a second lower locking member disposed adjacent the lower second side for engaging the second guide locking member; and
    a plurality of upward facing wheel runners adjacent to the top of the lower structure and oriented parallel to the first and second guide rails;
    at least one lower catch member disposed adjacent to the lower back end of the lower structure;
    lower support wheels affixed to the lower structure adjacent to the lower bottom, wherein the lower support wheels are oriented such that they support the lower extendable assembly and facilitate travel of the lower extendable assembly in a direction parallel to the first and second guide rails while disposed between the first and second guide rails; and
    a plurality of lower alignment wheels disposed adjacent to the lower first and lower second sides, wherein the plurality of lower alignment wheels movably engage the first and second inward facing guide channels;
  an upper extendable assembly comprising:
    an upper structure having an upper top and upper bottom, upper front and upper back ends, and opposed first and second upper sides linking the upper front and upper back ends;
    a bed supported by the upper structure;
    a plurality of upper tracking wheels affixed to the bottom of, and are adjacent to, the upper structure, wherein upper tracking wheels contact, and are oriented such that they rollably engage each of the plurality of upward facing wheel runners;
    at least one upper locking member adapted to releasably engage the lower extendable assembly and lock the upper extendable assembly and the lower extendable assembly together such that they cannot be independently moved in a direction parallel to the first and second guide rails; and
    at least one upper catch member adapted to hingably engage said at least one lower catch member, respectively, when the upper extendable assembly is moved relative to the lower extendable assembly along the plurality of upward facing wheel runners, and wherein when said at least one lower catch member and said at least one upper catch member are hingably engaged, the upper back end of the upper extendable assembly can tilt downward.

The cargo handling system eliminates the current necessity to climb or crawl into the cargo bed. Further, a cargo dumping feature provided by the upper extendable assembly allows for easy use and cleaning when heavy loads such as dirt, crushed rock, bricks, chopped wood, garbage, brush, etc. is hauled in the cargo bed. Still further, when the lower extendable assembly is extended beyond the end of the open tailgate and optional legs are deployed, it may make a fine workbench.

The cargo handling system can be used as an accessory for a pickup truck or any other vehicle with a flat cargo area/bed such as sport utility vehicles, utility vans, light trucks, for example. Due to its ease of use, both professionals and amateurs can readily use it for various hauling and dumping tasks.

The cargo handling system may be provided as an aftermarket vehicle (pickup truck or other) accessory either as a kit or fully assembled.

Features and advantages of the present disclosure will be further understood upon consideration of the detailed description as well as the appended claims.

BRIEF DESCRIPTION OF THE DRAWINGS

FIG. 1A is a schematic rear perspective view showing exemplary cargo handling system 100 in a retracted transport configuration secured to a cargo bed of a pickup truck.

FIG. 2A is a schematic perspective top view of exemplary guide assembly 200.

FIG. 2B is a schematic end view of guide assembly 200.

Figure 1B:
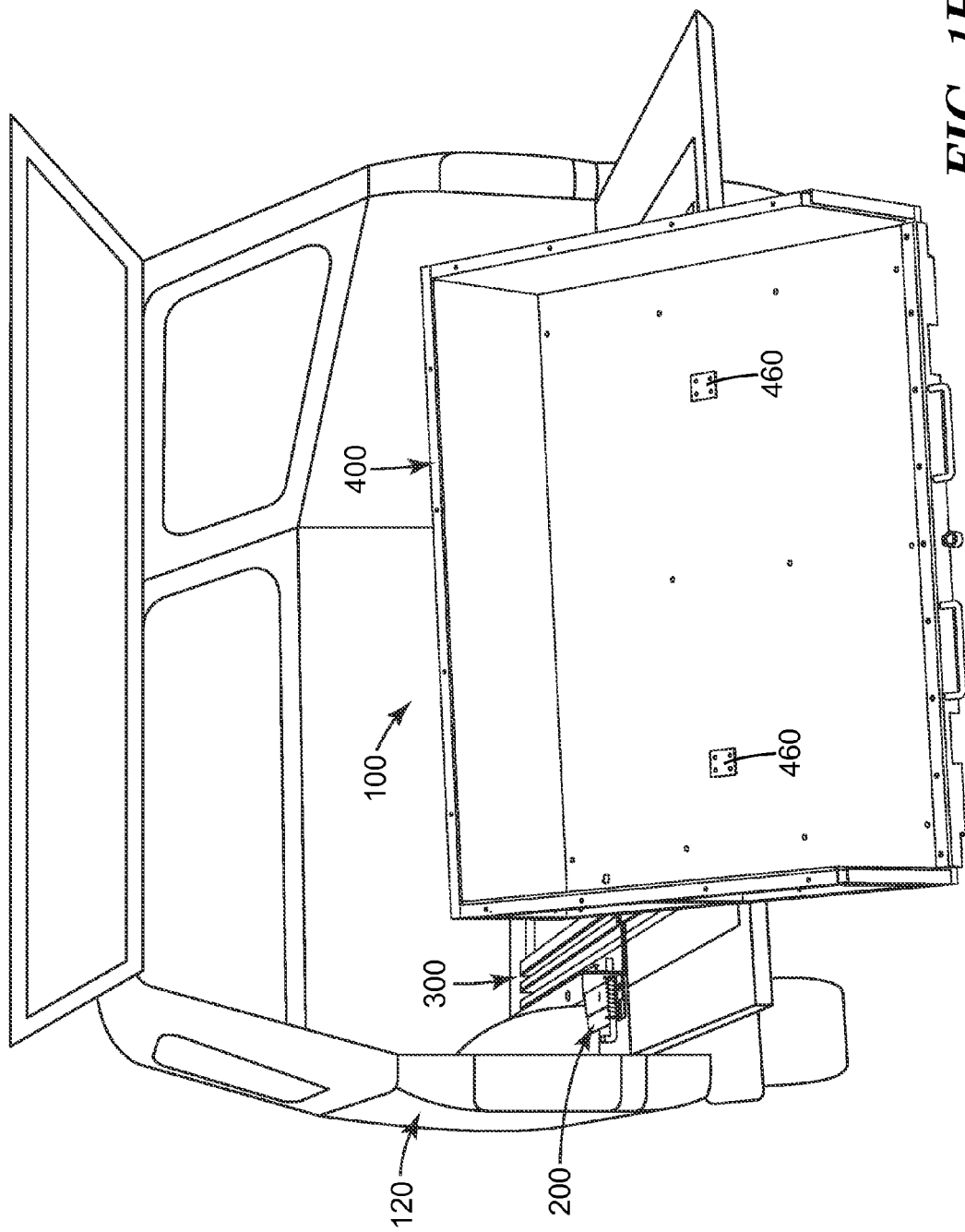
FIG. 1B is a schematic rear perspective view of showing cargo handling system 100 shown in FIG. 1A in an extended unloading configuration.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

FIGS. 1A and 1B illustrate the operational features of exemplary cargo handling system 100 installed in pickup truck 120. Referring now to FIG. 1A, cargo handling system 100 is shown in its retracted configuration, which may be typical of a transport and/or storage configuration. Guide assembly 200 is securely mounted to cargo bed 110 of pickup truck 120 by bolts 255. Lower extendable assembly 300 movably (e.g., slidably and/or rollably) engages guide assembly 200, and upper extendable assembly 400 rollably engages (by upper tracking wheels 440 shown in FIG. 4B) lower extendable assembly 300 such that the upper extendable assembly 400 can be repositioned (e.g., manually and/or using mechanical means) and dumped toward the rear of cargo bed 110 during unloading (shown in FIG. 1B). Lower and upper catch members 360 (See FIG. 1A), 460 (See FIG. 1B) engage one another and serve to limit rearward travel of upper extendable assembly 400 relative to lower extendable assembly 300. Further, when mutually engaged, they preferably hinge upper extendable assembly 400 to facilitate downward tilting of upper extendable assembly 400 (as shown in FIG. 1B) and dumping of any cargo that may be present thereon.

Advantageously, when the appropriate locking members are released, the cargo handling system may be unloaded under some circumstances by simply backing the vehicle and stopping. If sufficiently loaded, and especially if on a downhill incline, the top extendable assembly will continue to travel backwards and will dump spontaneously.

When installed in a cargo vehicle, the guide assembly may be secured to the cargo bed by welds, bolts, pins, rivets, adhesive, or a combination thereof, for example, preferably between any wheel wells that may be present.

The lower extendable assembly and guide assembly are preferably mutually configured such that lower extendable assembly is rearwardly extensible at least partially beyond (i.e., partially beyond or fully beyond) the cargo bed, and more preferably at least partially beyond optional tailgate 140 (shown in FIG. 1A) that may be present (e.g., in the case of a pickup truck). Optional tailgate protector 268 (also shown in FIG. 1A) may be mounted on optional tailgate 140 for protection. The lower extendable assembly is preferably lockable in position relative to the guide assembly (e.g., continuously or at predetermined intervals).

Likewise, the upper extendable assembly, lower extendable assembly, and guide assembly are preferably mutually configured such that upper extendable assembly is rearwardly extensible at least partially beyond (i.e., partially beyond or fully beyond) the cargo bed, and more preferably at least partially beyond any tailgate that may be present.

The upper extendable assembly is supported by upper tracking wheels that engage the upward facing wheel runners of the lower extendable assembly. The upper extendable assembly may have any suitable dimensions, but is preferably about half of the length (front to rear) of the lower extendable assembly. The upper extendable assembly is preferably lockable in at least one position relative to the lower extendable assembly (e.g., continuously or at predetermined intervals). The upper extendable assembly travels along the length of the lower extendable assembly, preferably along substantially the entire length, and cantilevers rearward and tilts downward in order to dump cargo.

Further details concerning the various sub-assemblies of the cargo handling system will now be discussed in further detail.

Referring now to FIGS. 2A and 2B, guide assembly 200 comprises parallel first and second guide rails 210, 220 comprising respective front and back ends 212a, 212b and 222a, 222b. First guide rail 210 comprises first inward facing guide channel 214 that extends longitudinally along the inner side 219 of first guide rail 210. Likewise, second guide rail 220 comprises second inward facing guide channel 224 that extends longitudinally along the inner side 229 of second guide rail 220. First guide rail 210 has a first guide locking member 216 secured thereto toward back end 212b. Second guide rail 220 has a second guide locking member 226 secured thereto toward back end 212b.

The guide rails may be made of any suitable material including, for example, metal, wood, carbon fiber composite material, and/or plastic (e.g., low density polyethylene, polypropylene, and engineering thermoplastics). Examples of engineering thermoplastics include acrylonitrile butadiene styrene (ABS), nylon 6, nylon 6,6, polyamides (PA), polybutylene terephthalate (PBT), polycarbonates (PC), polyetheretherketone (PEEK), polyetherketone (PEK), polyethylene terephthalate (PET), polyimides, polyoxymethylene plastic (POM/Acetal), polyphenylene sulfide (PPS), polyphenylene oxide (PPO), polysulfone (PSU), polytetrafluoroethylene (PTFE), ultra-high-molecular-weight polyethylene (UHMWPE), and ultrahigh molecular weight polypropylene (UHMWPP). Regardless of the material selected, it should desirably be fabricated into sufficiently sturdy guide rails to function without breaking during normal operation.

While the first and second guide locking members 216, 226 are shown in FIG. 2A as spring loaded retractable pins that extend through holes (corresponding to the first and second lower locking members 334, 344) in the sides of the lower extendable assembly (see FIG. 3C), they can comprise any device capable of locking the guide assembly to the lower extendable assembly to prevent longitudinal displacement between the two. Other suitable locking members include, for example, bolts, pins, spring clips, and clamps.

Referring again to FIG. 2A, while first and second guide rails 210, 220 may be secured directly to the cargo bed 110 (e.g., using bolts, rivets, structural adhesive, or by welding), it may also be desirable to include an optional bed protector 260 that helps protect the cargo bed from debris that may occur during cargo handling. In addition, pre-aligning the guide rails and securing them to the bed protector (e.g., in a factory setting) with fasteners prior to securing the guide assembly to the cargo bed eliminates to need to facilitate alignment of the guide rails during installation. Bed protector 260 has a top 262 and a bottom 264. In the configuration shown in FIGS. 2A and 2B, first and second guide rails 210, 220 contact and are secured to top 262 of optional bed protector 260. In this case, bottom 264 may be secured to the cargo bed by bolts 255.

Optional bed protector 260 may be made of any suitable material, preferably stiff enough to provide a useful degree of impact protection to the cargo bed. Examples of suitable materials include, plywood, metal (as used herein the term "metal" includes pure metals and alloys), and plastics (e.g., low density polyethylene (LDPE), high density polyethylene (HDPE), polypropylene, and engineering thermoplastics). If desired, the guide assembly may include one or more structural reinforcing elements such as cross members connecting the first and second guide rails and/or longitudinal ribs and/or gussets on one or both of the guide rails, for example. If present, optional bed protector 260 preferably provides structural reinforcement to the guide rails.

The guide rails may comprise rails and/or tracks similar or identical to those used for mounting garage doors, which provide a convenient and low cost means of providing inward facing channels. Examples of suitable guide rails include box tracks/rails, garage door tracks/rails, door slide tracks, I-beams, U-beams, and C-beams. Other configurations of the guide rails may also be used and will be apparent to those of ordinary skill in the art.

Referring again to FIG. 2A, optional guide runners 270 may be included in the guide assembly to facilitate tracking of the lower extendable assembly and/or to provide a more even surface for the lower extendable assembly to travel on. As with the first and second guide rails, these may be directly attached to the cargo bed and/or to the bed protector member. In embodiments in which the first and second guide rails are physically connected to each other (e.g., by cross members or a bed protector) the guide assembly may be placed on the cargo bed without physical restraint to the cargo bed; however, it is generally preferable to secure the guide assembly to the cargo bed to eliminate shifting during transit and use. While three optional guide runners 270 are shown in FIG. 2A, any number (e.g., one, two, three, or four) of guide runners may be used.

Figure 3A:
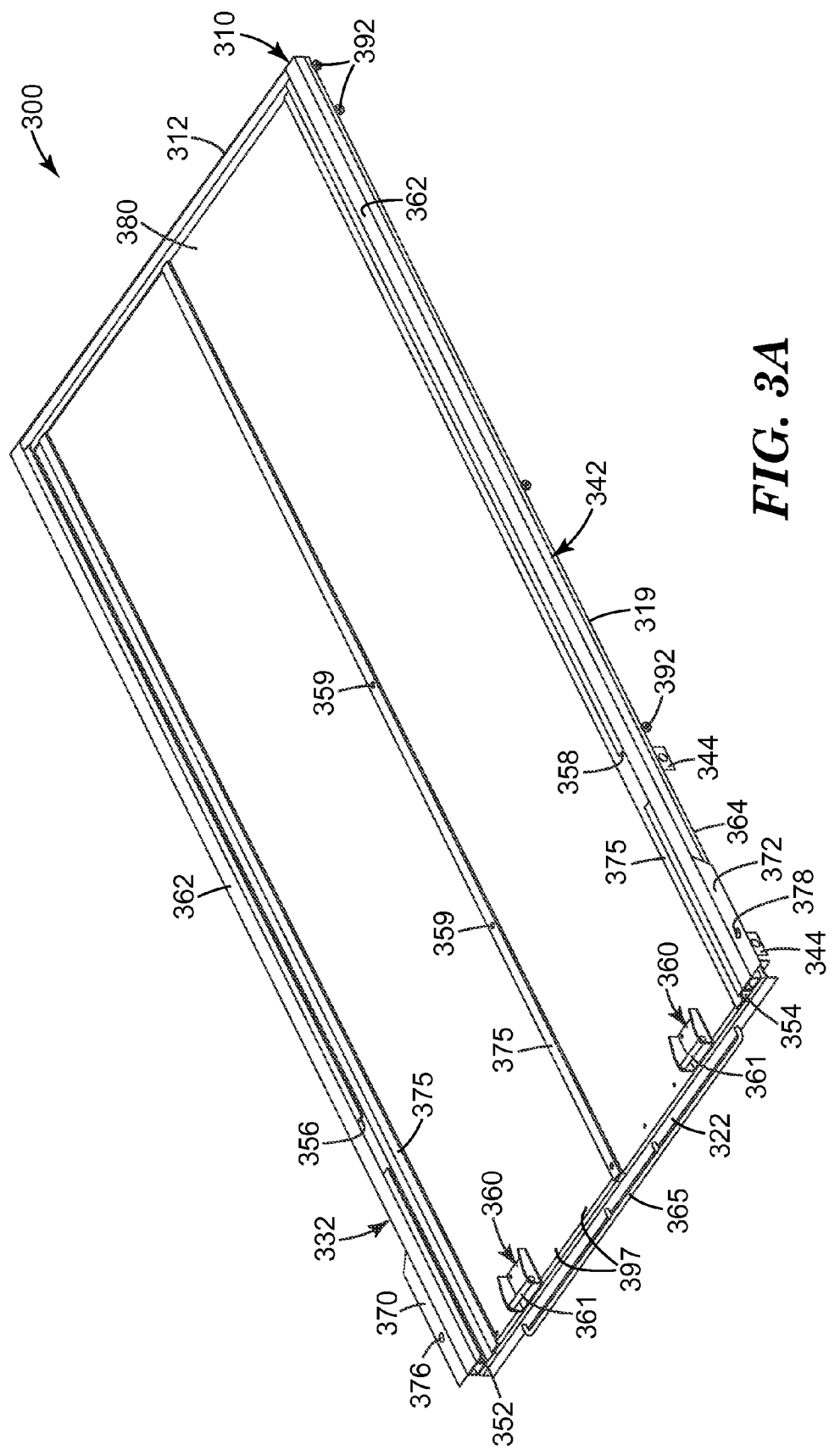
FIG. 3A is a schematic top perspective view of exemplary lower extendable assembly 300.
Figure 3B:
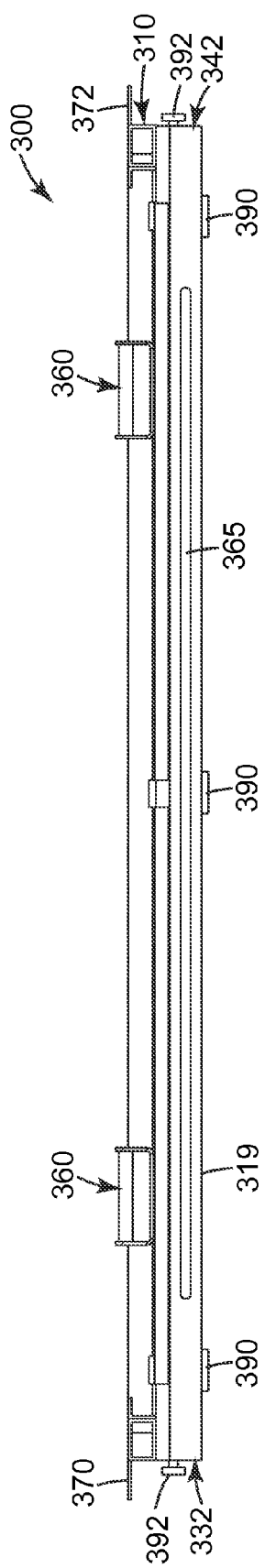
FIG. 3B is a schematic end view of lower extendable assembly 300.
Figure 3C:
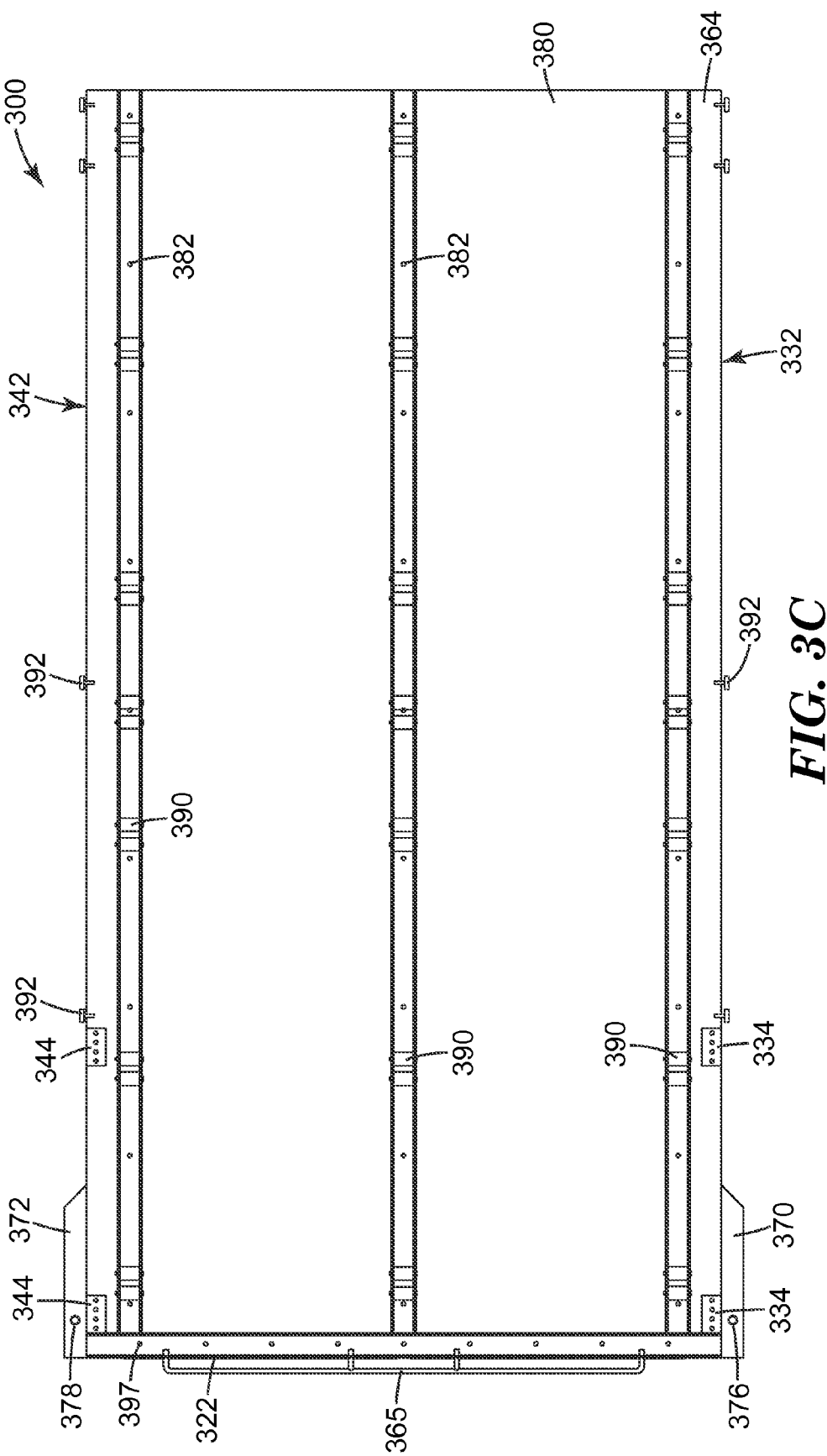
FIG. 3C is a schematic bottom view of lower extendable assembly 300.

Referring now to FIGS. 3A-3C, lower extendable assembly 300 includes lower structure 310 with lower top 362 and lower bottom 364, lower front end and lower back ends 312, 322, and opposed first and second lower sides 332, 342 linking lower front and lower back ends 312, 322. First lower locking flange 370, containing first lower locking hole 376, extends outwardly from first lower side 332. Second lower locking flange 372, containing second lower locking hole 378, extends outwardly from second lower side 342.

The lower structure may be made of any suitably strong and dimensionally stable material including, for example, metal, wood, carbon fiber composite material, and/or engineering thermoplastic. Regardless of the material selected, it should desirably be fabricated into a sufficiently sturdy structure to function without breaking during normal operation. Moreover, if desired, the lower extendable assembly may further include one or more structural reinforcing elements (e.g., stiffeners) such as: cross members connecting the first and second sides and/or longitudinal ribs; and gussets, blocks (e.g., 1 inch×2 inches×⅛ inch aluminum stock), or other stiffening members on one or both of first and second lower sides 332, 342.

Figure 1C:
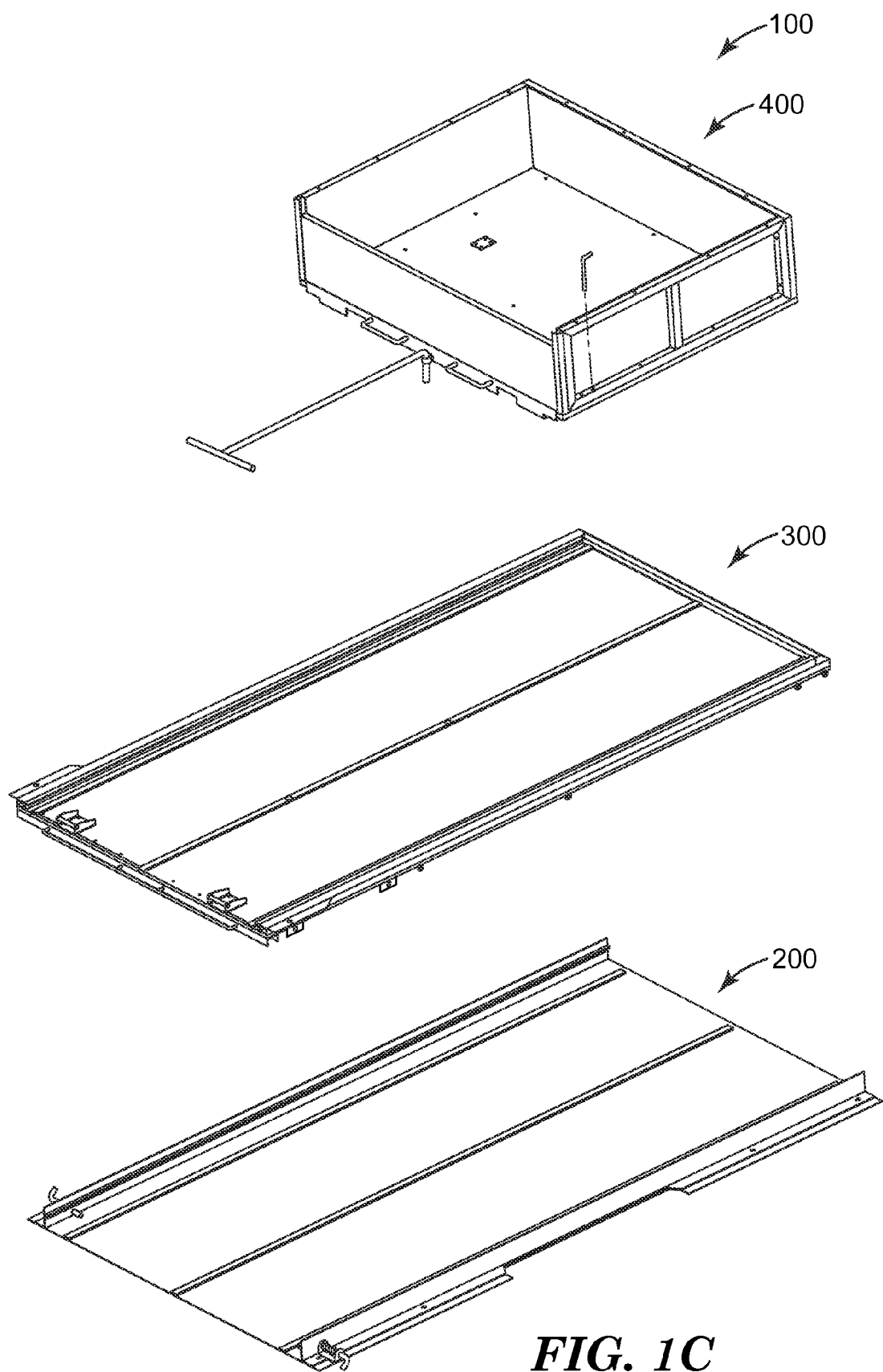
FIG. 1C is a schematic exploded perspective view of showing cargo handling system 100 in a retracted configuration.

First lower side 332 comprises first lower locking members 334 (exemplified as strike plates, each with a hole extending therethrough) that are adapted to engage first guide locking member 216, enabling it to be locked in place. Likewise, second lower side 342 comprises second lower locking members 344 (also shown as strike plates, each with a hole extending therethrough) that are adapted to engage second guide locking member 226 (see FIG. 1C), enabling it to be locked in place.

Referring now to FIGS. 3A-3C, first and second lower sides 332, 342 further comprise a plurality of optional lower stabilizing wheels 392, in addition to any structural lateral support elements of the structure that may be added, which rollably travel within respective first and second inward facing guide channels 214, 224 (shown in FIG. 2A) and provide additional support. However, lower stabilizing wheels 392 need not be part of the first and second lower sides 332, 342 as long as the sides extend into the corresponding inward facing guide channels 214, 224. Optional lower stabilizing wheels 392 are generally not load bearing, and mainly serve to prevent the lower extendable assembly from tilting relative to the guide assembly during loading and/or unloading. Generally, they should be of small enough dimensions that they easily travel within the first and second guide channels without undue friction; although a modest degree of friction may be acceptable.

Figure 5:
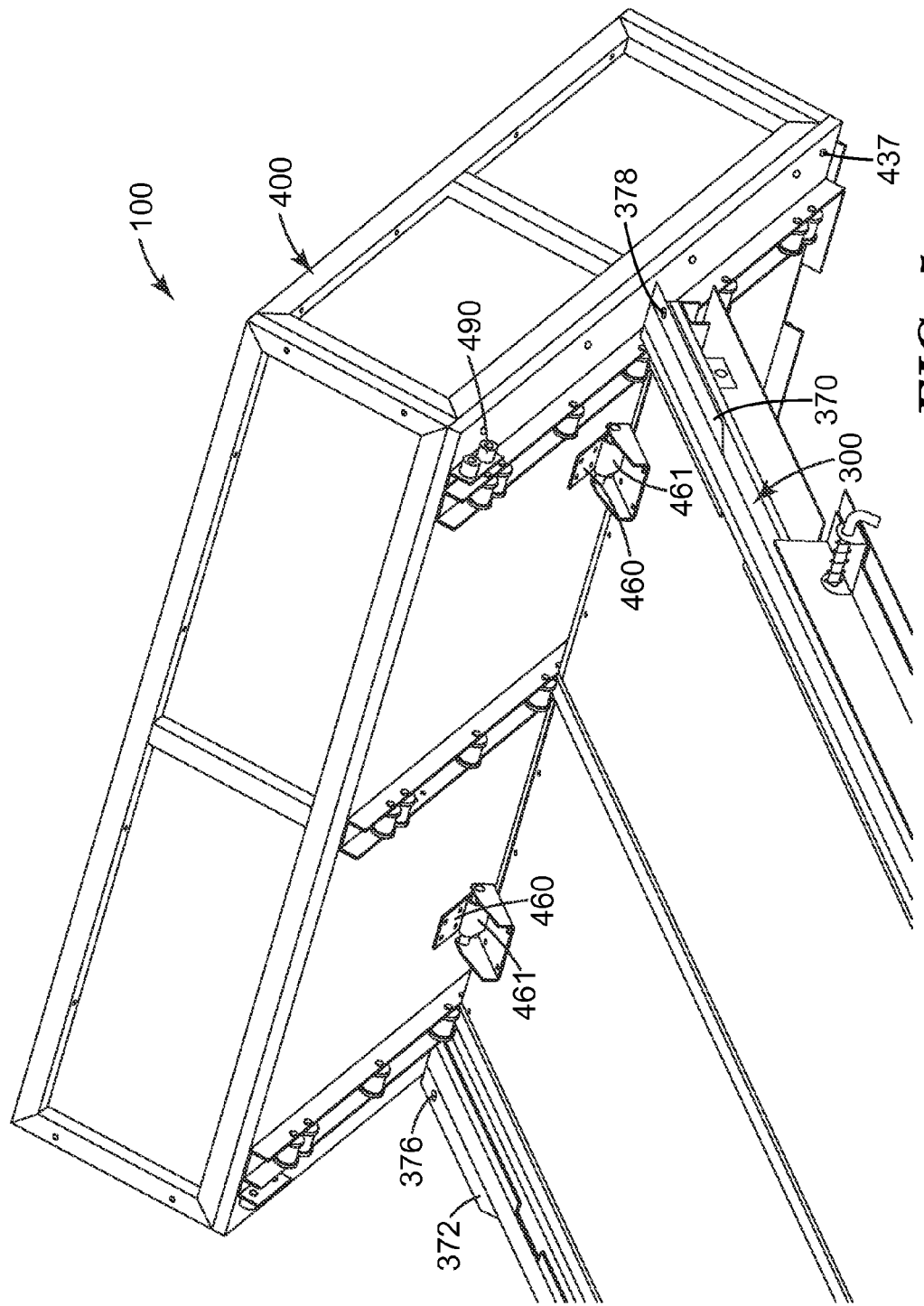
FIG. 5 is a schematic rear facing view of cargo handling system 100 in a dumping configuration.

Referring again to FIG. 3A, first and second lower sides 332, 342 optionally comprise longitudinally-oriented first and second lower inward facing lower channels 352, 354 that movably engage optional upper stabilizing wheels 392 of upper extendable assembly 400 (see FIG. 5). That is, at least a portion of the first and second lower sides can move forward and/or backward within the respective first and second lower channels as the upper extendable assembly is moved in a forward of rearward direction relative to the lower extendable assembly.

A plurality (e.g., at least 2, at least 3, or even at least 4) of upward facing wheel runners 375 are secured to lower structure 310 and oriented parallel to first and second guide rails 210, 220.

Optional lower bed 380 extends across lower structure 310. In this embodiment, upward facing wheel runners 375 are disposed on lower bed 380 which secures them to lower structure 310; however, they may alternatively be secured directly to the front and back ends 312, 322 of lower structure

Figure 6A:
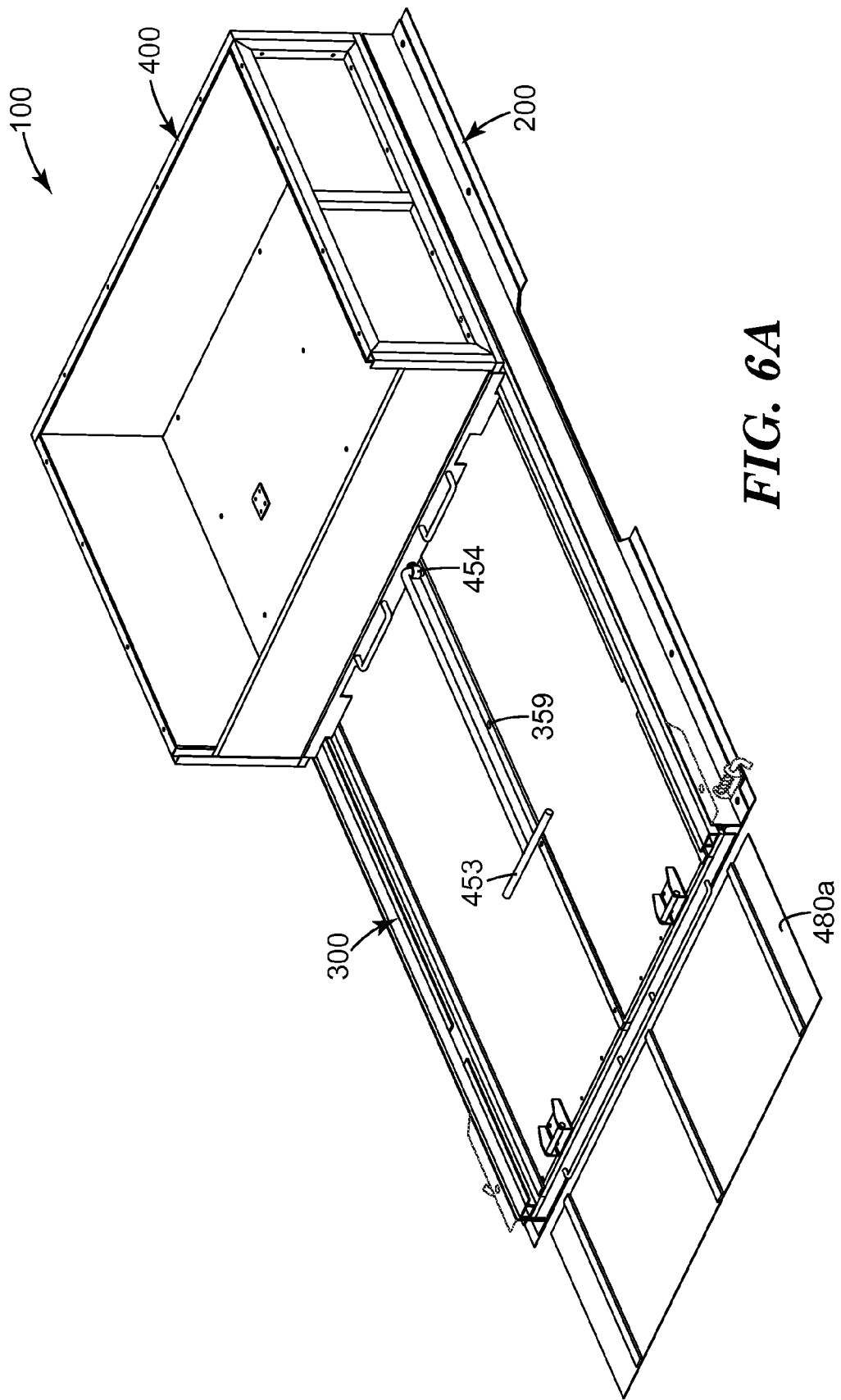
FIGS. 6A-6C are schematic perspective views of exemplary cargo handling system 100 showing various configurations during use.

310. Components of lower extendable assembly 300 may be secured to the lower structure by screws 397 and bolts 382. Lower locking holes 359 are adapted to engage upper locking member 453 at one or more positions (e.g., corresponding to fully and partially retracted configurations, see FIGS. 6A-6C). Suitable upper locking members may include any device(s) suitable for releasably engaging the lower extendable assembly. Examples include pins, bolts, latches, clips, hooks and clamps. As shown in FIG. 6A, exemplary upper locking member 453 is a rod with a handle at one and a right angle bend at the opposite end, thereby allowing it to function as a locking pin to removably and remotely engage eye 454 secured to upper extendable assembly 400 and lower locking holes 359.

As shown in FIG. 3C, a plurality of lower wheels 390 are affixed to bottom 319 of lower structure 310 such that they are oriented to support lower extendable assembly 300 and facilitate its travel in a direction parallel to the first and second guide rails 210, 220 while disposed therebetween. Lower extendable assembly 300 movably engages longitudinally-oriented first and second inward facing guide channels 214, 224 (see FIG. 2A). Upward facing lower catch members 360 are disposed adjacent to the lower back end 322 of lower structure 310. Lower handle 365 is secured to the lower back end 322 of lower extendable assembly 300 to facilitate positioning of the lower extendable assembly 300 handling by the operator during use.

The lower catch members may be positioned at one or more desired locations on the lower extendable assembly; for example, to provide various locking positions for the upper extendable assembly. The lower catch members (e.g., strike plates or bars) are preferably sufficiently durable and/or reinforced that they can stand up to repeated use with heavy cargos.

The lower catch members engage the upper catch members to fix the position of the upper and lower extendable assemblies in use at a predetermined position and/or prevent accidental over-extension of the upper extendable assembly during use. Collectively, the upper and lower catch members may be any engageable two-part fastening system such as, for example, a two-part latch system.

The lower wheels may directly contact the cargo bed and/or they may contact rails of the guide assembly, for example. The lower wheels may comprise any durable material. Examples include vulcanized rubber, metal, ceramic thermosets (e.g., rubber toughened epoxies and Bakelite), thermoplastics (e.g., polypropylene, polyethylene, acrylonitrile-butadiene-styrene (ABS) terpolymer, and engineering thermoplastics (e.g., ultrahigh molecular weight polyethylene (UHMWPE)). The lower wheels may comprise single wheels, dual wheels, dual casters, and/or any other combination of wheels (both bearing and non-bearing), for example.

In embodiments wherein the lower wheels travel on optional support rails included in the guide assembly, the lower wheels may be advantageously configured as lower tracking wheels (e.g., spool rollers, single-flanged rollers) that rollably engage and travel along the support rails while being guided by the support rails, and which may be the same or different from the upper tracking wheels. In such cases, the lower tracking wheels are preferably made of an engineering thermoplastic such as ultrahigh molecular weight polyethylene (UHMWPE), although lesser grades (e.g., HDPE) may also be useful depending on the intended use, cost, and durability requirements, for example.

The lower extendable assembly may further comprise optional support legs (not shown) (e.g., folding support legs or removable support legs) disposed adjacent to back end 322 of the lower structure 310, although this is not a requirement. Support legs may provide additional stability to the extended lower extendable assembly. Support legs may be telescoping, thereby allowing the lower extendable assembly to be supported on uneven ground.

While typically not used while dumping cargo, this feature allows the cargo handling system to provide easy access to cargo items (e.g., tools and/or supplies) that it is desirable to retain. In these embodiments, the cargo handling system can also effectively serve as a work bin (or bins if subdivided).

The optional lower bed may be made of any suitable material, preferably stiff enough to provide a useful degree of reinforcement and support of any components (e.g., lower wheels, lower catch members, and support rails) that may be affixed thereto. Examples of suitable materials include, plywood, metal, and plastics (e.g., low density polyethylene (LDPE), high density polyethylene (HDPE), polypropylene, and engineering thermoplastics). The bed may include one or more openings, or it may be uninterrupted, for example. Optionally, metal plate(s) may be secured to the upper surface and/or front and/or back ends of the lower bed to provide additional wear protection and/or reinforcement.

Figure 4A:
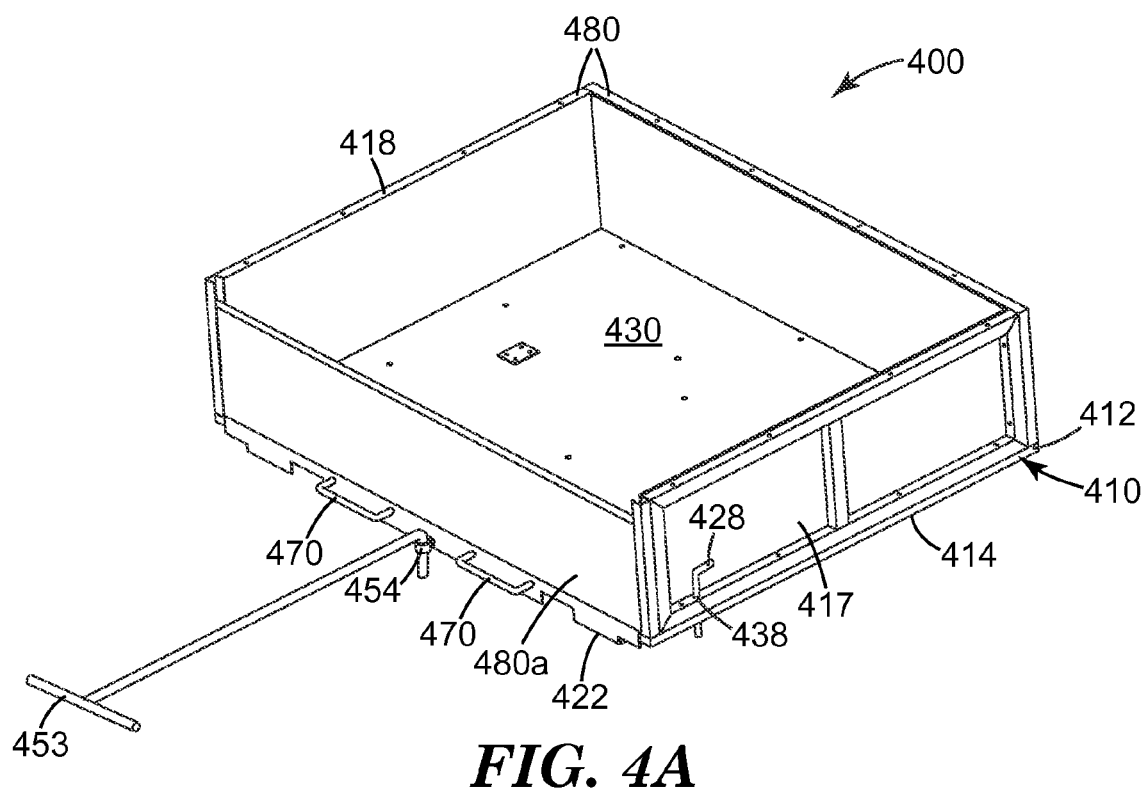
FIG. 4A is a schematic top perspective view of exemplary upper extendable assembly 400.
Figure 4B:
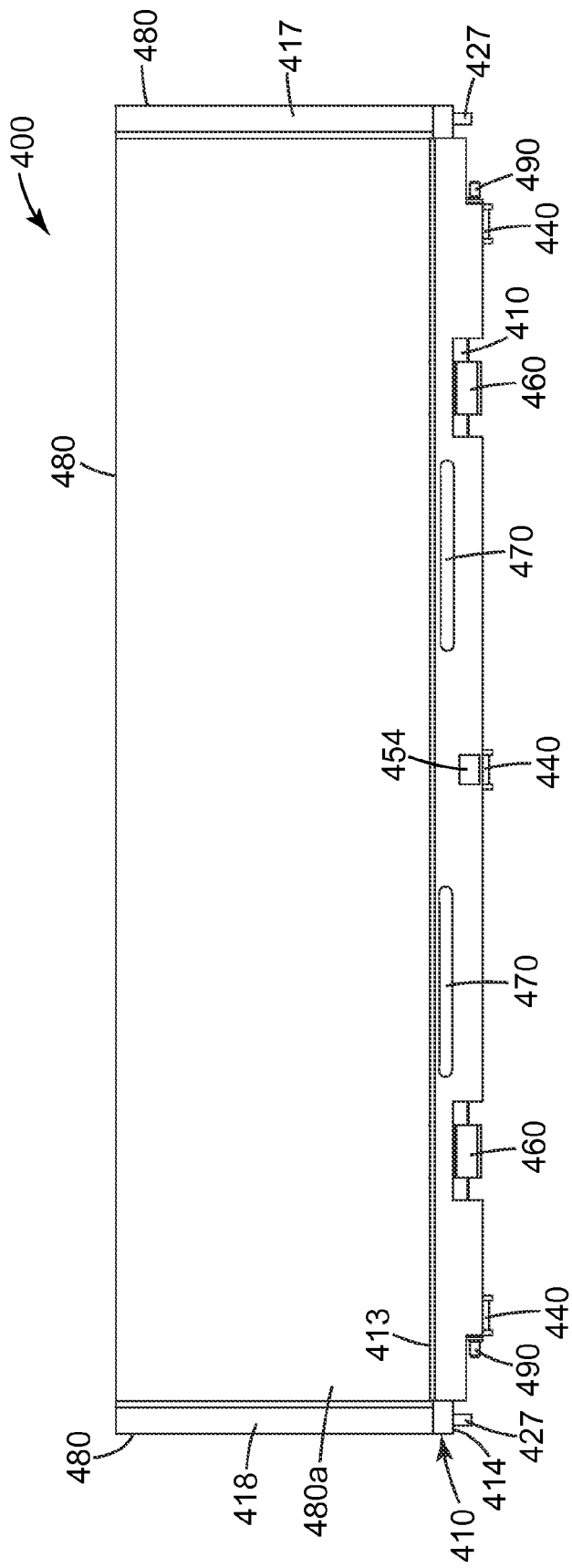
FIG. 4B is a schematic end view of upper extendable assembly 400.
Figure 4C:
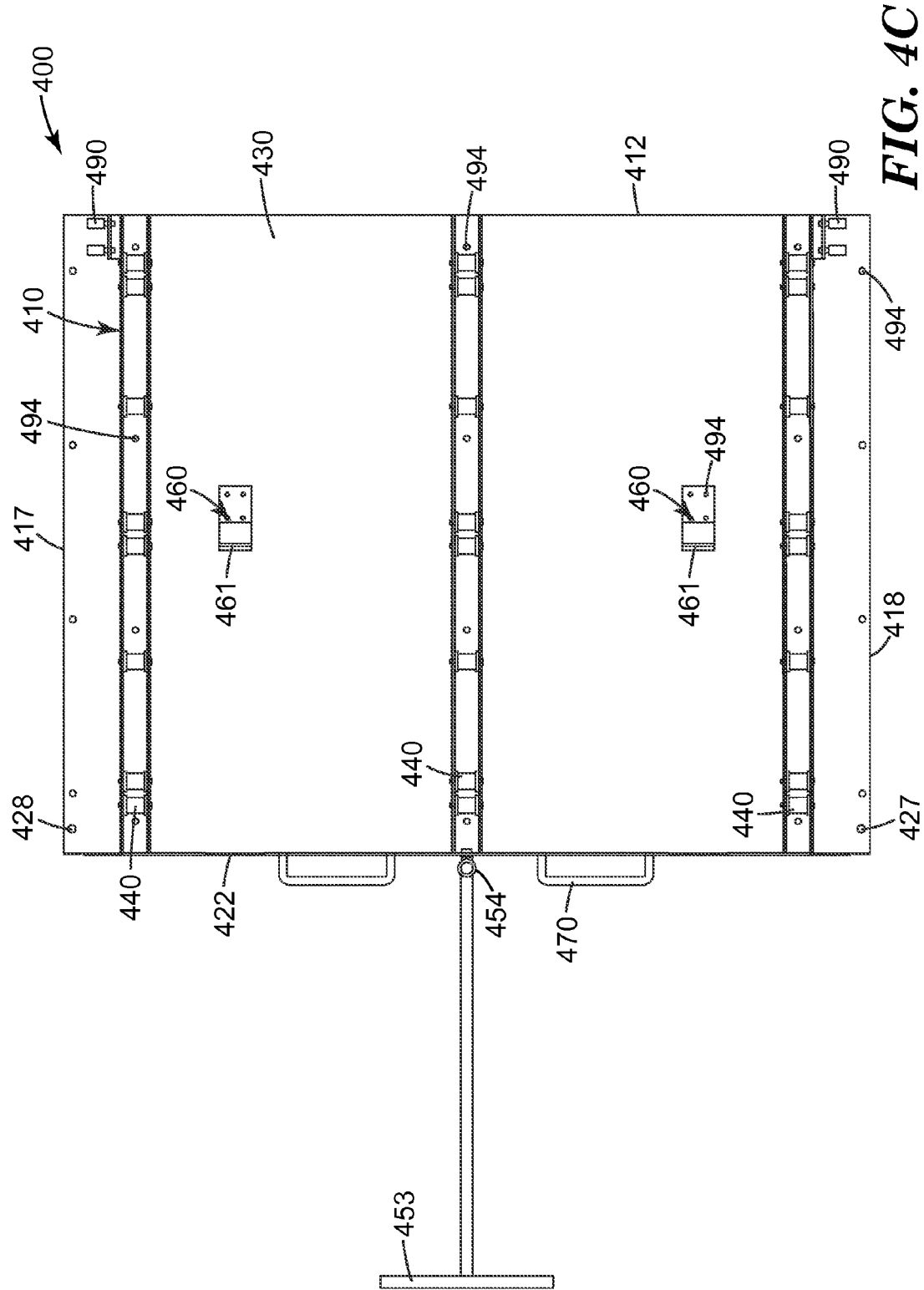
FIG. 4C is a schematic bottom view of upper extendable assembly 400.

Referring now to FIGS. 4A-4C, upper extendable assembly 400 includes upper structure 410 having an upper top 413, upper bottom 414, upper first and second upper sides 417, 418, and upper front and upper back ends 412, 422. Upper bed 430 is supported by upper structure 410. Optional box sides 480 (e.g., one, two, three, or four sidewalls) served to confine cargo on upper extendable assembly 400, although they may be unnecessary or even undesirable in some cases. Accordingly, they are preferably removably secured to the upper structure 410. Upper tracking wheels 440 (shown as spool rollers) are affixed to bottom 414 of upper structure 410 in rows positioned such that the upper tracking wheels 440 rollably engage upward facing wheel runners 375 on lower extendable assembly 300. Exemplary upper tracking wheels include spool rollers, single-flanged rollers (e.g., resembling a train wheel), and rollers that are mounted between plates that extend along one or more sides of the upward facing support rail(s). The various components of upper extendable assembly 400 are held together by screws 494.

To secure the upper extendable assembly 400 relative to the lower extendable assembly 300 (e.g., during transport), first and second side locking members 427, 428 (shown as angled rods) releasably engage first and second upper side locking holes 437, 438 and first and second lower side locking holes 376, 378, respectively. While preferred, this feature is not required. While first and second side locking members 427, 428 are shown as angled rods, other fasteners such as, e.g., bolts, screws, and/or clamps may also be used.

The upper extendable assembly may be constructed of materials used for the lower extendable assembly (e.g., as discussed hereinabove). To facilitate smooth operation and low maintenance, upper tracking wheels 440 preferably comprise an engineering thermoplastic material (e.g., ultrahigh molecular weight polyethylene (UHMWPE)).

Upper catch members 460 are adapted to hingably engage the lower catch members 360, respectively (see FIG. 5). While multiple upper and lower catch members are shown in the figures, single upper and/or lower catch members may also be used. For example, a single upper catch member having a long horizontal bar that can pivotably engage two or more hooked lower catch members may be used in place of two upper catch members each having short horizontal bars.

When the upper extendable assembly is moved relative to the lower extendable assembly along the plurality of upward facing wheel runners, and wherein when said at least one lower catch member and said at least one upper catch member are hingably engaged, the back end of the upper extendable assembly can tilt downward (preferably spontaneously although not required). In certain embodiments, the upper extendable assembly further comprises at least one upper handle affixed to the upper structure. The upper handle facilitates handling of the upper extendable assembly by the operator during use.

Preferably, the guide assembly, lower extendable assembly, and upper extendable assembly are rectangular in shape and/or otherwise adapted to conform to the cargo bed of the vehicle in which it is intended to be used. The upper extendable assembly may be the same width (i.e., side to side with respect to the cargo handling system) or slightly narrower than the lower extendable assembly depending on configuration of the cargo bed of the vehicle in which it is intended for use. The length of the upper extendable assembly may vary depending on the length of the cargo bed length, but preferably its length is approximately half the length of the cargo bed. As with the lower extendable assembly, the upper extendable assembly may incorporate various stiffening and or protective elements such as those described for the lower extendable assembly.

Optional front and side upper box sides 480 are preferably removably mounted to the upper structure 410. Optional upper handles 470 provide for easy handling of the upper extendable assembly.

The box sides may be made of any suitable material including, for example, wood, metal, plastic (e.g., polypropylene or polyethylene), and combinations thereof.

Components of the cargo handling system may be unfinished and/or painted, stained, dyed, or otherwise finished.

If present, optional upper locking member 453 slidably (and preferably reversibly) engages lower locking holes 359 in lower bed 380, thereby allowing the upper extendable assembly to be fixed in predetermined positions relative to the lower extendable assembly.

As shown in FIG. 5, when the upper and lower catch members 460, 360 are engaged, bars 361 engage hooked portions 461 of upper catch members 460.

Figure 6B:
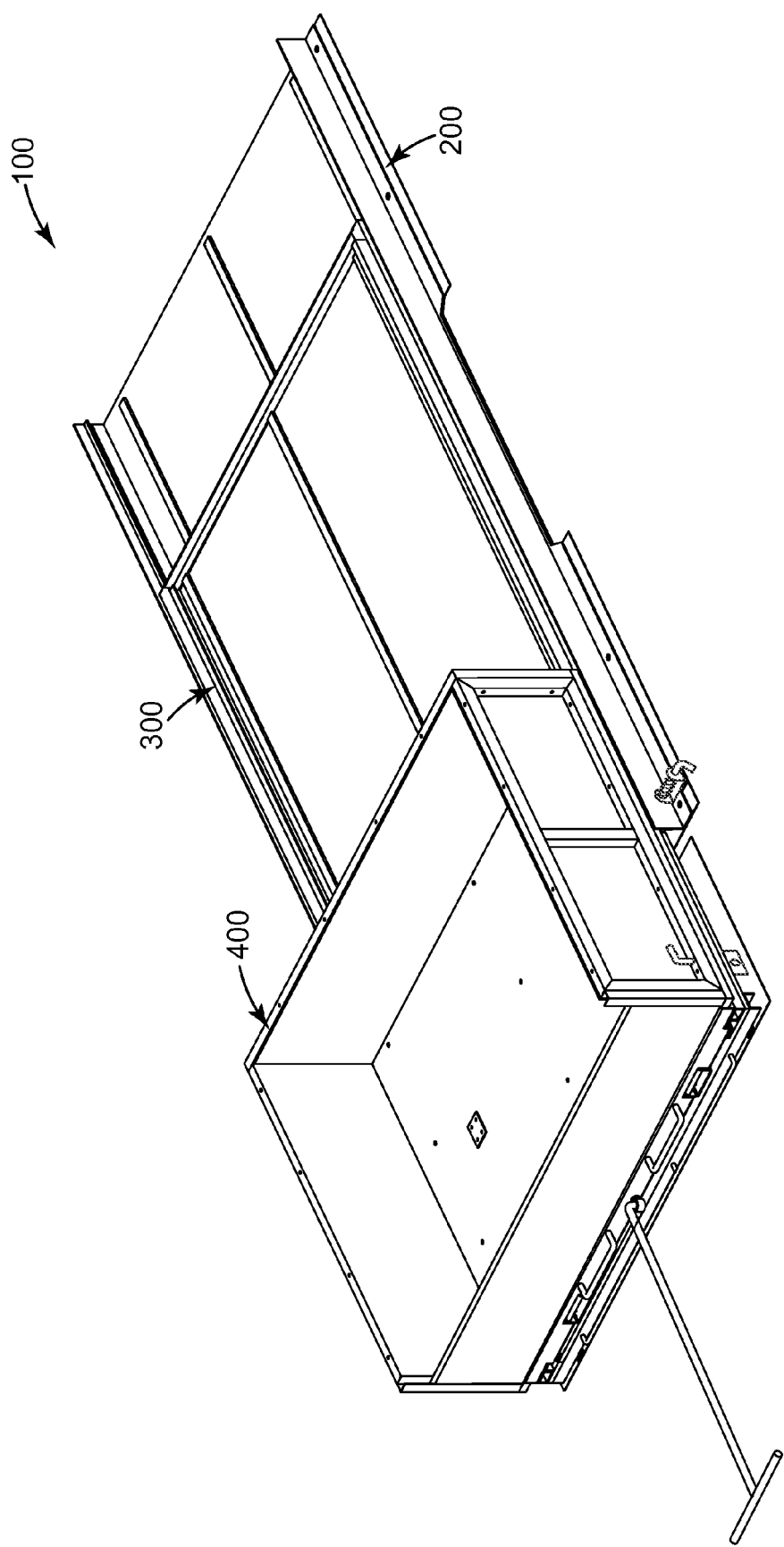
Figure 6C:
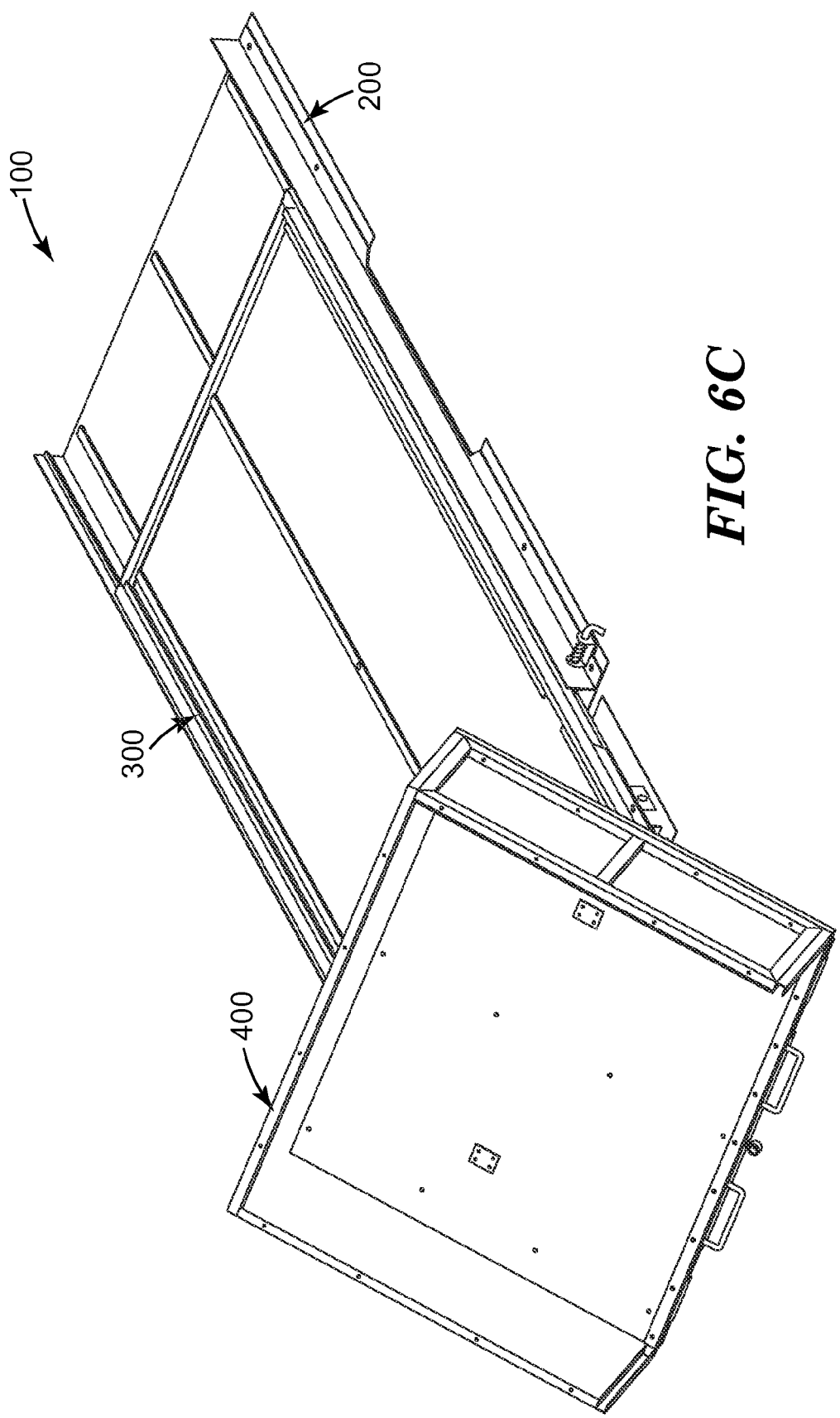

FIGS. 6A-6C show operation of cargo handling system 100 shown in FIGS. 1A and 1B in greater detail. FIG. 6A depicts cargo handling system 100 in a retracted position in which the cargo handling system is fully contained within the cargo bed. This configuration is useful, for example, when the cargo handling system is in transit or stored. To release the upper extendable assembly 400 from its initial forward locked position (see FIG. 4C) the operator disengages the upper locking member 453 (shown as a pin although other releasable locking mechanisms may also be used) by removing it from lower locking hole 359 in lower extendable assembly 300, thereby freeing the upper extendable assembly to be pulled forward to a cantilever position suitable for dumping.

FIG. 6B depicts cargo handling system 100 in a second (operational) configuration with tailgate 140 in its open (down) position. In this configuration, the lower extendable assembly 300 is extended rearward beyond the guide assembly 200 until it is flush with the outer edge of lowered tailgate and locked in place. Upper extendable assembly 400 travels rearward until upper and lower catch members 460, 360, at which point the upper extendable assembly can be tilted downward.

FIG. 6C depicts a configuration in which both the upper extendable assembly and the lower extendable assembly are extended rearwardly in an unloading position, and the upper extendable assembly is tilted downward. The extend of rearward travel of the upper extendable assembly relative to the lower extendable assembly is controlled by the location of the upper and lower catch members 460, 360. When the upper and lower catch members are engaged, they function as a pivot point (e.g., a hinge) for dumping upper extendable assembly 400. Accordingly, the lower catch members 360 should be positioned sufficiently rearward on the lower extendable assembly 300 that when the upper and lower catch members 460 are engaged upper extendable assembly 400 is free to tilt downward for unloading cargo.

Likewise, first and second top openings 356, 358 (see FIG. 3A) in respective first and second lower channels 352, 354 should be positioned such that they align with upper stabilizing wheels 490 that travel, within first and second lower channels 352, 354. Thus, when the upper extendable assembly is tilted to dump cargo, the upper stabilizing wheels can lift up and out of the first and second lower channels. Preferably, the upper stabilizing wheels are of sufficiently small size that they do not contact the first and second lower channel surfaces in the retracted configuration of the upper extendable assembly; however, in extended configurations they are capable of rollably travelling along the upper surface of the lower channels thereby preventing the upper extendable assembly from tipping prematurely (e.g., before the upper and lower catch members are engaged) as it cantilevers out beyond the lower extendable assembly. The upper stabilizing wheels are secured to the upper structure by any suitable means (e.g., brackets, bolts, clamps and/or welds). Preferably, the upper stabilizing wheels are made of a resilient material such as a natural or synthetic rubber, although any durable material may be used (e.g., metal or plastic).

Any degree of tilting may be used; however, the tilt angle is preferably at least 45 degrees, and more preferably at least 60 degrees.

Once cargo is unloaded in this manner, the vehicle (e.g., pickup truck) is preferably driven forward to separate the dumped cargo from the cargo handling system, although this is not a requirement. To return the cargo handling system to its initial locked retracted configuration, the operator lifts the back end of the upper extendable assembly and pushes the upper extendable assembly forward toward the vehicle truck cab. Upper locking member 453 is engaged with a lower locking hole 359 when the upper extendable assembly is in its retracted configuration and the handle is returned to its initial position to secure lower extendable assembly. To send the lower extendable assembly back into the cargo bed, first and second guide locking members 216, 226 on first and second guide rails 210, 220 are released, and lower extendable assembly 300 is pushed back into the truck. Once retracted, lower locking members (shown as spring loaded pins) 328 are engaged to lock the lower extendable assembly in its initial locked position, and the tailgate of the pickup truck is then closed.

The cargo handling system may further comprise one or more additional extendable assemblies, supported on the upper extendable assembly, which is/are rearwardly extendable; for example, in the manner described for either of the upper and/or lower extendable assemblies.

Select Embodiments of the Present Disclosure

In a first embodiment, the present disclosure provides a cargo handling system comprising:
  a guide assembly comprising:
    parallel first and second guide rails each comprising respective front and back rail ends, wherein the first guide rail has an inward facing first channel and the second guide rail has an inward facing second channel, wherein the first guide rail has a first guide locking member secured thereto toward the back rail end of the first guide rail, and wherein the second guide rail has a second guide locking member secured thereto toward the back rail end of the second guide rail;

a lower extendable assembly comprising:

a lower structure comprising a lower top and lower bottom, lower front and lower back ends, and opposed lower first and lower second sides linking the lower front and lower back ends;

a first lower locking member disposed adjacent the lower first side for engaging the first guide locking member; and a second lower locking member disposed adjacent the lower second side for engaging the second guide locking member; and a plurality of upward facing wheel runners adjacent to the top of the lower structure and oriented parallel to the first and second guide rails;

at least one lower catch member disposed adjacent to the lower back end of the lower structure;

lower support wheels affixed to the lower structure adjacent to the lower bottom, wherein the lower support wheels are oriented such that they support the lower extendable assembly and facilitate travel of the lower extendable assembly in a direction parallel to the first and second guide rails while disposed between the first and second guide rails; and a plurality of lower alignment wheels disposed adjacent to the lower first and lower second sides, wherein the plurality of lower alignment wheels movably engage the first and second inward facing guide channels;

an upper extendable assembly comprising:

an upper structure having an upper top and upper bottom, upper front and upper back ends, and opposed first and second upper sides linking the upper front and upper back ends;

a bed supported by the upper structure;

a plurality of upper tracking wheels affixed to the bottom of, and are adjacent to, the upper structure, wherein upper tracking wheels contact, and are oriented such that they rollably engage each of the plurality of upward facing wheel runners;

at least one upper locking member adapted to releasably engage the lower extendable assembly and lock the upper extendable assembly and the lower extendable assembly together such that they cannot be independently moved in a direction parallel to the first and second guide rails; and at least one upper catch member adapted to hingably engage said at least one lower catch member, respectively, when the upper extendable assembly is moved relative to the lower extendable assembly along the plurality of upward facing wheel runners, and wherein when said at least one lower catch member and said at least one upper catch member are hingably engaged, the upper back end of the upper extendable assembly can tilt downward.

In a second embodiment, the present disclosure provides a cargo handling system according to the first embodiment, wherein the lower extendable assembly further comprises first and second longitudinally-oriented inward facing lower channels, adjacent to the respective lower first and lower second sides, wherein the first and second longitudinally-oriented inward facing lower channels are disposed adjacent to the lower top;

wherein the upper extendable assembly further comprises upper stabilizing wheels adjacent and secured to the upper bottom, and wherein the upper stabilizing wheels engage the first and second inward facing lower channels and limit tilting of the upper extendable assembly relative to the lower extendable assembly when the at least one upper catch member is not engaged with the at least one lower catch member; and wherein the first inward facing lower channel has a first top opening, wherein the second inward facing lower channel has a second top opening, wherein first and second top openings are positioned to permit the upper stabilizing wheels to be removed from the first and second inward facing lower channels when the at least one upper catch member is engaged with the at least one lower catch member and the upper back end of the upper extendable assembly is tilted downward.

In a third embodiment, the present disclosure provides a cargo handling system according to the first or second embodiment, wherein the guide assembly further comprises a bed protector having a bed protector top and a bed protector bottom, and wherein the first and second guide rails contact and are secured to the bed protector top.

In a fourth embodiment, the present disclosure provides a cargo handling system according to any one of the first to third embodiments, wherein at least one of the first and second guide locking members comprises a bolt or a spring-loaded pin.

In a fifth embodiment, the present disclosure provides a cargo handling system according to any one of the first to fourth embodiments, wherein the lower structure further comprises a lower bed that extends across the top of the lower structure, and said plurality of upward facing wheel runners are disposed on the lower bed.

In a sixth embodiment, the present disclosure provides a cargo handling system according to the fifth embodiment, wherein each one of the at least one lower catch member comprises a respective horizontal bar, and wherein each one of the at least one upper catch member has a hooked profile.

In a seventh embodiment, the present disclosure provides a cargo handling system according to any one of the first to sixth embodiments, wherein the upper extendable assembly further comprises at least three upwardly extending contiguous sidewalls.

In an eighth embodiment, the present disclosure provides a cargo handling system according to any one of the first to sixth embodiments, wherein the upper extendable assembly further comprises four upwardly extending contiguous sidewalls.

In a ninth embodiment, the present disclosure provides a cargo handling system according to any one of the first to eighth embodiments, wherein said plurality of upward facing wheel runners comprises at least three upward facing wheel runners.

In a tenth embodiment, the present disclosure provides a cargo handling system according to any one of the first to tenth embodiments, wherein at least three of the plurality of upper tracking wheels rollably engage each of the plurality of upward facing wheel runners.

In an eleventh embodiment, the present disclosure provides a cargo handling system according to any one of the first to tenth embodiments, wherein the plurality of upper tracking wheels comprise ultrahigh molecular weight polyethylene.

In a twelfth embodiment, the present disclosure provides a cargo handling system according to any one of the first to eleventh embodiments, wherein the cargo handling system is disposed on a cargo bed of a pickup truck.

In a thirteenth embodiment, the present disclosure provides a cargo handling system according to the twelfth embodiment, wherein the first and second guide rails are bolted to the cargo bed.

In a fourteenth embodiment, the present disclosure provides a cargo handling system according to any one of the first to thirteenth embodiments, wherein the lower extendable assembly further comprises at least one lower handle affixed to the lower back end.

In a fifteenth embodiment, the present disclosure provides a cargo handling system according to any one of the first to fourteenth embodiments, wherein the upper extendable assembly further comprises at least one upper handle affixed to the upper structure.

In a sixteenth embodiment, the present disclosure provides a cargo handling system according to any one of the first to fifteenth embodiments, wherein the guide assembly further comprises a plurality of cross members, each contacting and secured to the first and second guide rails.

In a seventeenth embodiment, the present disclosure provides a cargo handling system according to any one of the first to sixteenth embodiments, wherein the lower extendable assembly further comprises at least one collapsible support leg disposed adjacent to the lower back end.

In an eighteenth embodiment, the present disclosure provides a cargo handling system according to any one of the first to seventeenth embodiments, wherein the lower structure further comprises a lower bed that extends between the lower front and lower back ends, and between the lower first and lower second sides.

In a nineteenth embodiment, the present disclosure provides a cargo handling system according to any one of the first to eighteenth embodiments, wherein:

the lower extendable assembly further comprises a first lower locking flange extending outwardly from the first lower side and containing a first lower locking hole, wherein the lower extendable assembly further comprises a second lower locking flange extending outwardly from the second lower side and containing a second lower locking hole; and wherein the upper extendable assembly further comprises first and second upper side locking holes disposed first and second upper sides, and wherein the upper extendable assembly further comprises first and second side locking members that releasably engage the first and second upper side locking holes and the first and second lower locking holes, respectively.

In a twentieth embodiment, the present disclosure provides a cargo handling system according to the nineteenth embodiment, wherein the first and second side locking members comprise angled rods.

All cited references, patents, and patent applications in the above application for letters patent are herein incorporated by reference in their entirety in a consistent manner. In the event of inconsistencies or contradictions between portions of the incorporated references and this application, the information in the preceding description shall control.

The preceding description, given in order to enable one of ordinary skill in the art to practice the claimed disclosure, is not to be construed as limiting the scope of the disclosure, which is defined by the claims and all equivalents thereto.

What is claimed is:

1. A cargo handling system comprising:
    a guide assembly comprising:
        parallel first and second guide rails each comprising respective front and back rail ends, wherein the first guide rail has an inward facing first channel and the second guide rail has an inward facing second channel, wherein the first guide rail has a first guide locking member secured thereto toward the back rail end of the first guide rail, and wherein the second guide rail has a second guide locking member secured thereto toward the back rail end of the second guide rail;
    a lower extendable assembly comprising:
        a lower structure comprising a lower top and lower bottom, lower front and lower back ends, and opposed lower first and lower second sides linking the lower front and lower back ends;
        a first lower locking member disposed adjacent the lower first side for engaging the first guide locking member; and
        a second lower locking member disposed adjacent the lower second side for engaging the second guide locking member; and
        a plurality of upward facing wheel runners adjacent to the top of the lower structure and oriented parallel to the first and second guide rails;
        at least one lower catch member disposed adjacent to the lower back end of the lower structure;
        lower support wheels affixed to the lower structure adjacent to the lower bottom, wherein the lower support wheels are oriented such that they support the lower extendable assembly and facilitate travel of the lower extendable assembly in a direction parallel to the first and second guide rails while disposed between the first and second guide rails; and
        a plurality of lower alignment wheels disposed adjacent to the lower first and lower second sides, wherein the plurality of lower alignment wheels movably engage the first and second inward facing channels;
    an upper extendable assembly comprising:
        an upper structure having an upper top and upper bottom, upper front and upper back ends, and opposed first and second upper sides linking the upper front and upper back ends;
        a bed supported by the upper structure;
        a plurality of upper tracking wheels affixed to the bottom of and adjacent to the the upper structure, wherein the upper tracking wheels contact and are oriented such that they rollably engage each of the plurality of upward facing wheel runners;
        at least one upper locking member adapted to releasably engage the lower extendable assembly and lock the upper extendable assembly and the lower extendable assembly together such that they cannot be independently moved in a direction parallel to the first and second guide rails; and
        at least one upper catch member adapted to hingably engage said at least one lower catch member when the upper extendable assembly is moved relative to the lower extendable assembly along the plurality of upward facing wheel runners, and wherein when said at least one lower catch member and said at least one upper catch member are hingably engaged, the upper back end of the upper extendable assembly can tilt downward.

2. The cargo handling system of claim 1, wherein the lower extendable assembly further comprises first and second longitudinally-oriented inward facing lower channels, adjacent to respective ones of the lower first and lower second sides, wherein the first and second longitudinally-oriented inward facing lower channels are disposed adjacent to the lower top;
    wherein the upper extendable assembly further comprises upper stabilizing wheels adjacent and secured to the upper bottom, and wherein the upper stabilizing wheels engage the first and second inward facing lower channels and limit tilting of the upper extendable assembly relative to the lower extendable assembly when the at least one upper catch member is not engaged with the at least one lower catch member; and wherein the first inward facing lower channel has a first top opening, wherein the second inward facing lower channel has a second top opening, wherein the first and second top openings are positioned to permit the upper stabilizing wheels to be removed from the first and second inward facing lower channels when the at least one upper catch member is engaged with the at least one lower catch member and the upper back end of the upper extendable assembly is tilted downward.

3. The cargo handling system of claim 1, wherein the guide assembly further comprises a bed protector having a bed protector top and a bed protector bottom, and wherein the first and second guide rails contact and are secured to the bed protector top.

4. The cargo handling system of claim 1, wherein at least one of the first and second guide locking members comprises a bolt or a spring-loaded pin.

5. The cargo handling system of claim 1, wherein the lower structure further comprises a lower bed that extends across the top of the lower structure, and said plurality of upward facing wheel runners are disposed on the lower bed.

6. The cargo handling system of claim 5, wherein each one of the at least one lower catch member comprises a respective horizontal bar, and wherein each one of the at least one upper catch member has a hooked profile.

7. The cargo handling system of claim 1, wherein the upper extendable assembly further comprises at least three upwardly extending contiguous sidewalls.

8. The cargo handling system of claim 1, wherein the upper extendable assembly further comprises four upwardly extending contiguous sidewalls.

9. The cargo handling system of claim 1, wherein said plurality of upward facing wheel runners comprises at least three upward facing wheel runners.

10. The cargo handling system of claim 1, wherein at least three of the plurality of upper tracking wheels rollably engage each of the plurality of upward facing wheel runners.

11. The cargo handling system of claim 1, wherein the plurality of upper tracking wheels comprise ultrahigh molecular weight polyethylene.

12. The cargo handling system of claim 1, wherein the cargo handling system is disposed on a cargo bed of a pickup truck.

13. The cargo handling system of claim 12, wherein the first and second guide rails are bolted to the cargo bed.

14. The cargo handling system of claim 1, wherein the lower extendable assembly further comprises at least one lower handle affixed to the lower back end.

15. The cargo handling system of claim 1, wherein the upper extendable assembly further comprises at least one upper handle affixed to the upper structure.

16. The cargo handling system of claim 1, wherein the guide assembly further comprises a plurality of cross members, each contacting and secured to the first and second guide rails.

17. The cargo handling system of claim 1, wherein the lower structure further comprises a lower bed that extends between the lower front and lower back ends, and between the lower first and lower second sides.

18. The cargo handling system of claim 1, wherein:

the lower extendable assembly further comprises a first lower locking flange extending outwardly from the first lower side and containing a first lower locking hole, wherein the lower extendable assembly further comprises a second lower locking flange extending outwardly from the second lower side and containing a second lower locking hole; and wherein the upper extendable assembly further comprises first and second upper side locking holes disposed adjacent to the first and second upper sides, and wherein the upper extendable assembly further comprises first and second side locking members that releasably engage the first and second upper side locking holes and the first and second lower locking holes, respectively.

19. The cargo handling system of claim 18, wherein the first and second side locking members comprise angled rods.

* * * * *